(12) United States Patent
Dion et al.

(10) Patent No.: US 7,303,105 B2
(45) Date of Patent: Dec. 4, 2007

(54) ARCUATE FASTENER NAILING DEVICE FOR HARDWOOD FLOORING

(75) Inventors: Jean-Paul Dion, Quebec (CA); Marc Dion, St-Augustin-de-Desmaures (CA); Jacques Maltais, Beauport (CA)

(73) Assignee: Laboratoire Primatech Inc., Quebec, Qc (CA)

(*) Notice: Subject to any disclaimer, the term of this patent is extended or adjusted under 35 U.S.C. 154(b) by 4 days.

(21) Appl. No.: 11/584,520

(22) Filed: Oct. 23, 2006

(65) Prior Publication Data

US 2007/0017954 A1    Jan. 25, 2007

Related U.S. Application Data

(63) Continuation of application No. PCT/CA2005/000804, filed on May 26, 2005.

(30) Foreign Application Priority Data

Jun. 3, 2004    (CA) .................................. 2469726

(51) Int. Cl.
*B25C 5/06* (2006.01)
(52) U.S. Cl. ...................... 227/147; 227/148
(58) Field of Classification Search ................ 227/147, 227/148, 151, 119
See application file for complete search history.

(56) References Cited

U.S. PATENT DOCUMENTS

| | | | |
|---|---|---|---|
| 2,169,433 A | 8/1939 | Roy | |
| 2,403,222 A * | 7/1946 | Howells | ............ 227/134 |
| 2,692,382 A | 10/1954 | Raphaël | |
| 2,866,057 A | 12/1958 | Peck | |
| 3,012,247 A | 12/1961 | Sillars et al. | |
| 3,040,328 A | 6/1962 | Saltz | |
| 3,952,935 A * | 4/1976 | Erkenbrack | ............ 227/120 |
| 4,013,207 A | 3/1977 | Erkenbrack | |
| 4,354,588 A * | 10/1982 | Wolfertz | ............ 198/394 |

(Continued)

FOREIGN PATENT DOCUMENTS

CA    897352    4/1972

(Continued)

*Primary Examiner*—Brian D. Nash
(74) *Attorney, Agent, or Firm*—Francois Martineau

(57) ABSTRACT

A nailing device used for securing hardwood flooring planks to a subfloor using arcuate fasteners. The nailing device comprises a main body in turn defining a fastener discharge opening. The nailing device also comprises an arcuate fastener ejection channel made in the main body and destined to accommodate an arcuate fastener, the arcuate fastener ejection channel opening outwardly of the nailing device at the fastener discharge opening. The nailing device further comprises an arcuate plunger at least partially nested in the arcuate fastener ejection channel and movable along the arcuate fastener ejection channel between first and second limit positions. Moreover, the nailing device comprises a plunger actuator nested in the main body and connected to the arcuate plunger, which can be selectively activated for moving the arcuate plunger between its first and second limit positions. Upon activation of the plunger actuator, the plunger will move along the fastener ejection channel from its first limit position towards its second limit position to forcibly strike the arcuate fastener located in the fastener ejection channel and eject it out of the nailing device through the fastener discharge opening and into a subjacent workpiece.

14 Claims, 14 Drawing Sheets

U.S. PATENT DOCUMENTS

| | | | |
|---|---|---|---|
| 4,610,384 A * | 9/1986 | Duchin | 227/67 |
| 4,625,380 A | 12/1986 | Everhard et al. | |
| 4,627,562 A * | 12/1986 | Bone | 227/67 |
| 4,707,908 A | 11/1987 | Everhard et al. | |
| 5,715,985 A * | 2/1998 | Letson | 227/119 |
| 5,779,127 A * | 7/1998 | Blacket et al. | 227/107 |
| 5,813,114 A * | 9/1998 | Blacket et al. | 29/809 |
| 6,481,612 B1 | 11/2002 | Mangone | |
| 6,592,015 B1 * | 7/2003 | Gostylla et al. | 227/112 |
| 6,681,976 B2 * | 1/2004 | Opper et al. | 227/137 |
| 2003/0218046 A1 * | 11/2003 | Mangone, Jr. | 227/147 |

FOREIGN PATENT DOCUMENTS

| | | |
|---|---|---|
| CA | 2261329 | 8/1999 |
| CA | 2280539 | 2/2000 |
| CA | 2298865 | 10/2000 |
| DE | 19530244 | 2/1997 |

* cited by examiner

PRIOR ART

PRIOR ART

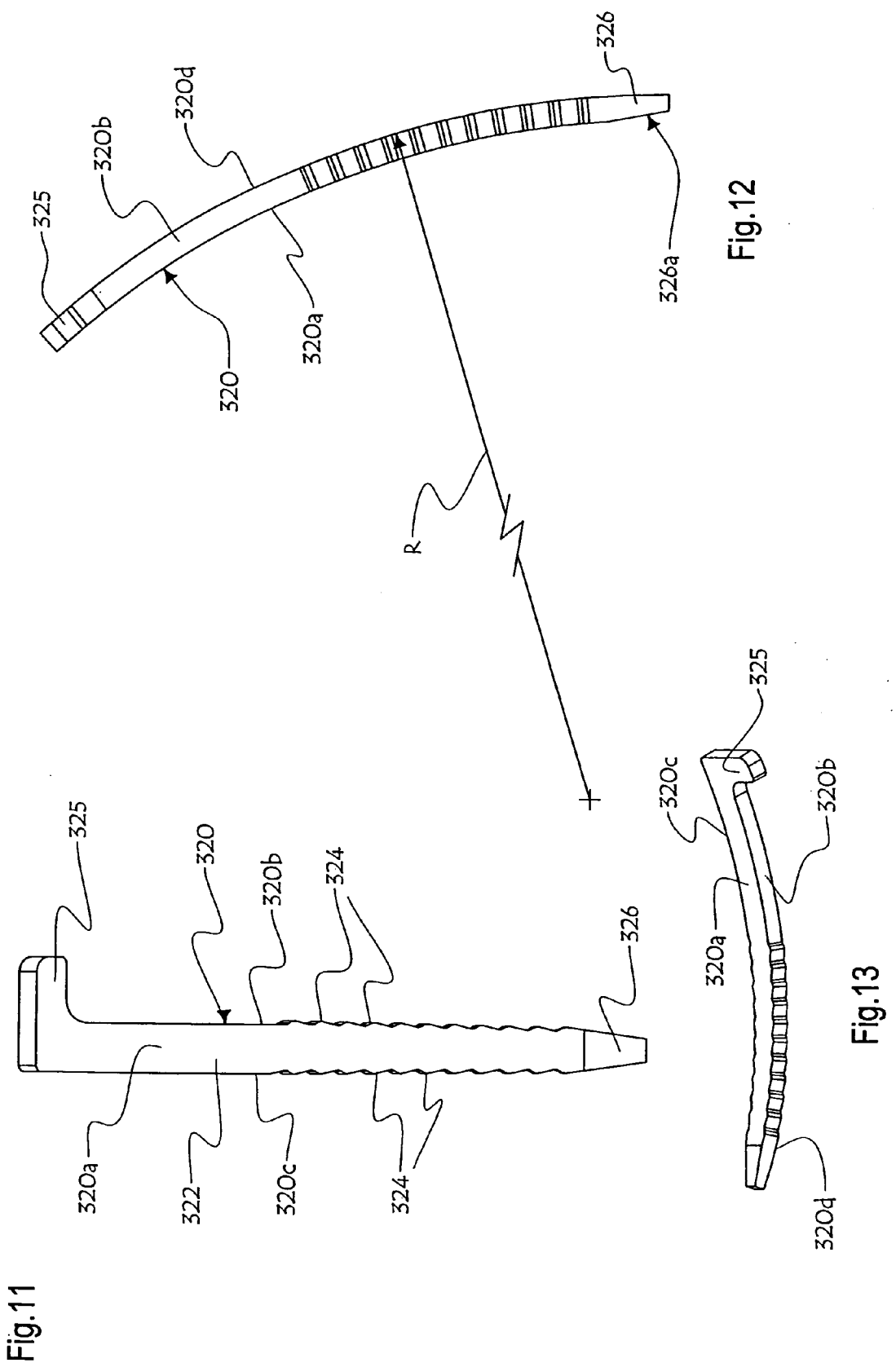

ARCUATE FASTENER NAILING DEVICE FOR HARDWOOD FLOORING

CROSS-REFERENCE DATA

The present patent application claims conventional priority of Canadian patent application no. 2,469,726 filed Jun. 3, 2004.

FIELD OF THE INVENTION

The present invention relates to fastener driving tools, and more particularly to a nailing device for driving arcuate fasteners through hardwood planks in order to secure them to a subfloor.

BACKGROUND OF THE INVENTION

Hardwood flooring generally consists of a number of elongate tongue-and-groove type planks individually fitted close to one another and then fastened in position to a subjacent subfloor. To fasten these hardwood planks to the subfloor of a room composed for example of plywood plates or floor joists, it is known to use a mallet-operated nailer. Such a nailer generally comprises a main body with a floor-engageable shoe mounted to its bottom surface, upon which the tool rests against a hardwood plank prior to discharging a fastener in the latter. Such a nailer also comprises a magazine holding fasteners such as straight metallic L- or T-shaped barbed straight cleats or U-shaped straight staples, and feeding them to a fastener discharge mechanism.

To fasten a hardwood plank to the subfloor, a workman has to lay the nailer onto a hardwood plank, and then use a mallet to strike an anvil member of the fastener discharge mechanism. When a mallet strikes the anvil member of the tool, a straight and elongated plunger of the fastener discharge mechanism is axially actuated to strike a cleat held in the magazine, this cleat being then forcibly ejected out of the tool. In order to achieve better anchoring of the plank to the subfloor, some nailers drive the fasteners through the plank and into the subfloor in an oblique direction (for example at 45° from the horizontal direction), as opposed to being driven in the planks vertically.

However, known nailers driving fasteners in an oblique fashion in hardwood planks cannot reach areas very close to upright walls. The reason for this is inter alia that the whole nailer tool itself, including its main piston and the trigger valve thereof, are at 45° from the vertical, and also the anvil member which upwardly diverges towards the upright wall, and thus there is no clearance available for passage of the mallet during striking action of the anvil member, or even for a tool released by a power assist hand trigger (that does not need mallet strike). The hardwood planks located parallel to an upright wall in closely spaced fashion cannot be anchored to the subfloor using such nailers, and the fasteners must instead be driven vertically, e.g. using a manual hammer and nail, into the hardwood plank edge portions adjacent to walls.

SUMMARY OF THE INVENTION

The present invention relates to a nailing device for securing hardwood flooring planks to a subfloor using arcuate fasteners, said nailing device comprising:

a main body defining a fastener discharge opening;

an arcuate fastener ejection channel made in said main body and destined to accommodate an arcuate fastener, said arcuate fastener ejection channel opening outwardly of said nailing device at said fastener discharge opening;

a plunger at least partially nested in said arcuate fastener ejection channel, said plunger movable along said arcuate fastener ejection channel between first and second limit positions; and a plunger actuator nested in said main body and connected to said plunger, wherein said plunger actuator can be selectively activated for moving said plunger between its said first and second limit positions;

wherein upon activation of said plunger actuator, said plunger will move along said fastener ejection channel from said first limit position towards said second limit position to forcibly strike the arcuate fastener located in said fastener ejection channel and eject it out of said nailing device through said fastener discharge opening and into a subjacent workpiece.

In one embodiment, said plunger comprises an elongated and arcuate hammer portion sweeping said fastener ejection channel for striking the fastener therein when said plunger actuator is selectively activated.

In one embodiment, said plunger actuator comprises at least one driving arm pivotally connected to said main body at one end and carrying said plunger at the other end, whereby said plunger is movable between its said first and second limit positions upon said driving arm being pivotally actuated.

In one embodiment, said plunger actuator further comprises a rectilinearly movable member capable of moving rectilinearly within said main body between first and second limit positions, said plunger actuator further comprising at least one cam member pivotally connected to said rectilinearly movable member at one end and to said driving arm at the other end, wherein upon selective activation of said plunger actuator, said rectilinearly movable member is actuated from its said first limit position towards its said second limit position, and said driving arm is concomitantly pivotally actuated such that said plunger moves from said first limit position towards said second limit position.

In one embodiment, said plunger actuator is compressed-air operated and said nailing device is provided with a compressed-air inlet for conveying compressed air thereto, said plunger actuator further comprising a cylinder defining an inner wall and an open end, said rectilinearly movable member being a piston sealingly and slidably engaging said cylinder inner wall and defining a piston head, said plunger actuator further comprising a valve selectively movable between open and closed positions, wherein said valve can be selectively moved to its open position to allow compressed air to flow into said cylinder in the area between said cylinder open end and said piston head in order for the compressed air to exert a pushing force on said piston biasing it towards its said second limit position.

In one embodiment:

said cylinder inner wall comprises first and second cylinder inner wall portions, said first inner wall portion having a diameter larger than that of said second inner wall portion;

said piston defines a cylindrical outer peripheral wall distanced from said cylinder inner wall by first and second annular spaced-apart projections projecting radially outwardly of said piston peripheral wall, said first annular projection being larger than said second annular projection, said first annular projection constantly engaging said first cylinder inner wall portion and said second piston annular projection constantly engaging said second cylinder inner wall portion during the movement of said piston between its said first and second limit positions;

an annular chamber is defined between said cylinder inner wall, said piston peripheral wall and said top and bottom piston annular projections; wherein said annular chamber comprises a compressed air inlet and said annular chamber is constantly pressurized during the operation of said nailing device, and a biasing force is thus constantly applied by compressed air from within said annular chamber on said piston and biasing said piston towards said first limit position;

wherein said biasing force applied from within said annular chamber is less important than said pushing force.

In one embodiment, said main body further defines a fastener channel for accommodating arcuate fasteners and for loading the arcuate fasteners in said arcuate guiding channel.

In one embodiment, said fastener ejection channel consists of at least a launching groove made in said main body.

The present invention also relates to an arcuate fastener comprising a fastener head and an arcuate fastener main body, said arcuate fastener for use with a nailing device as described above.

The present invention also relates to a nailer for securing hardwood flooring planks to a subfloor in edgewisely closely spaced fashion relative to an upstanding wall, said nailer for use with arcuate nails and comprising:

an elongated rigid main frame, said main frame defining a front end for facing the upstanding wall, and a rear end opposite said front end, and said main frame including a load bearing lower end portion for engagement over the flooring planks, an intermediate section defining a front end abutment surface for lateral abutment against the upstanding wall in an operative condition thereof, and an upper end portion adapted to transversely clear the upstanding wall in said operative condition;

an arcuate channel, made through said main frame lower end portion and sized for engagement by and through passage of the arcuate nails, said channel defining an intermediate section adjacent a plane extending through said front end abutment surface in downwardly offset fashion relative thereto in said operative condition, and a nail discharge outlet being mounted at a lowermost position of said main frame in said operative condition thereof; and ejection means, for power ejecting an arcuate nail one at a time through said nail discharge outlet and into the flooring planks and subfloor.

In one embodiment, said nailer further includes trigger means, mounted at said upper end portion of said main frame, said trigger means for actuating said ejection means.

In one embodiment, said trigger means includes an anvil member, exposed at the upper end portion of said main frame, said anvil member for receiving mallet strike blows along a strike blow axis for enabling actuation of said ejection means.

In one embodiment, the portion of said strike blow axis within said main frame lower end portion is rearwardly offset relative to said main frame front end, or alternately comes in vertical register therewith, although this latter model may have a slightly lower performance compared to the first mentioned one.

In one embodiment, the portion of said strike blow axis within said main frame lower end portion is rearwardly offset relative to said nail discharge outlet, or alternately comes in vertical register therewith, although again this latter model may have a slightly lower performance relative to the first mentioned one.

In one embodiment, said anvil member upwardly rearwardly diverges relative to the plane of said main frame front end.

In one embodiment, said anvil member upwardly rearwardly diverges relative to said nail discharge outlet.

In one embodiment, said ejection means is pneumatically assisted.

DESCRIPTION OF THE DRAWINGS

In the annexed drawings:

FIGS. 11, 12 and 13 show a plan view, a side elevational view and a front perspective view, respectively, of an arcuate cleat according to one embodiment of the present invention;

DETAILED DESCRIPTION OF THE EMBODIMENTS

Figure 1A:
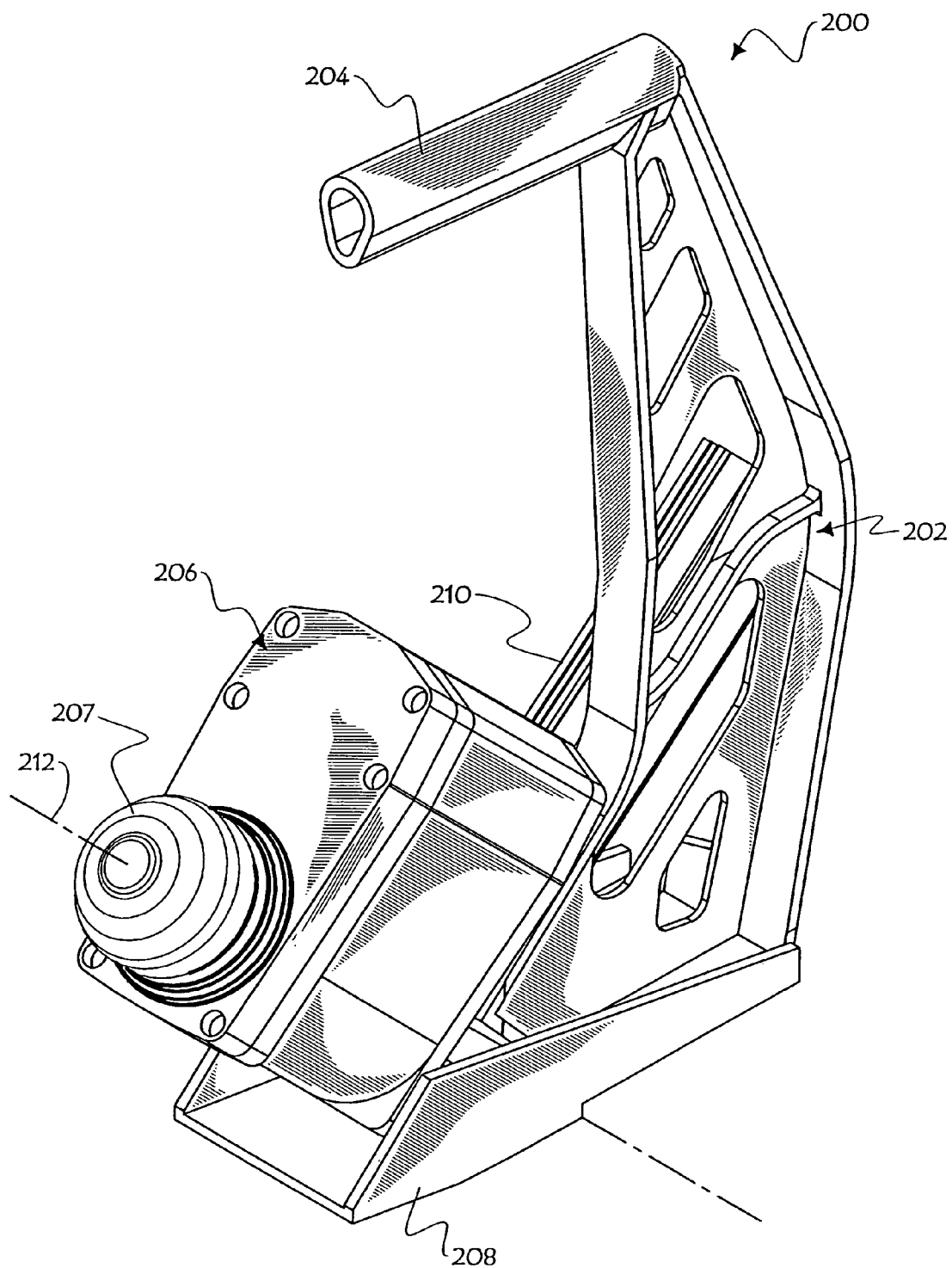
FIGS. 1A-1B show a perspective view and a left elevation respectively of a prior art pneumatic nailer.
Figure 1B:
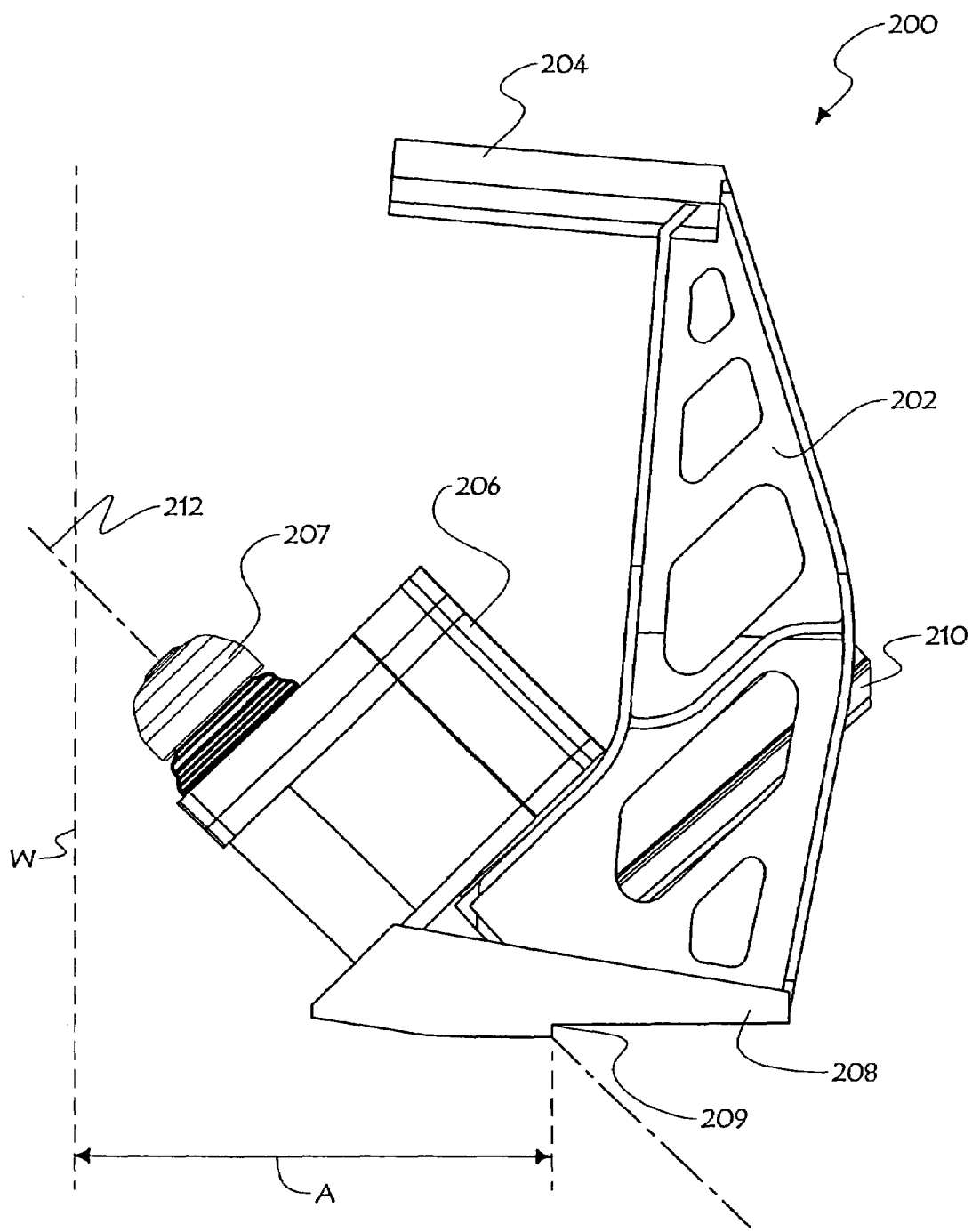
Figure 2:
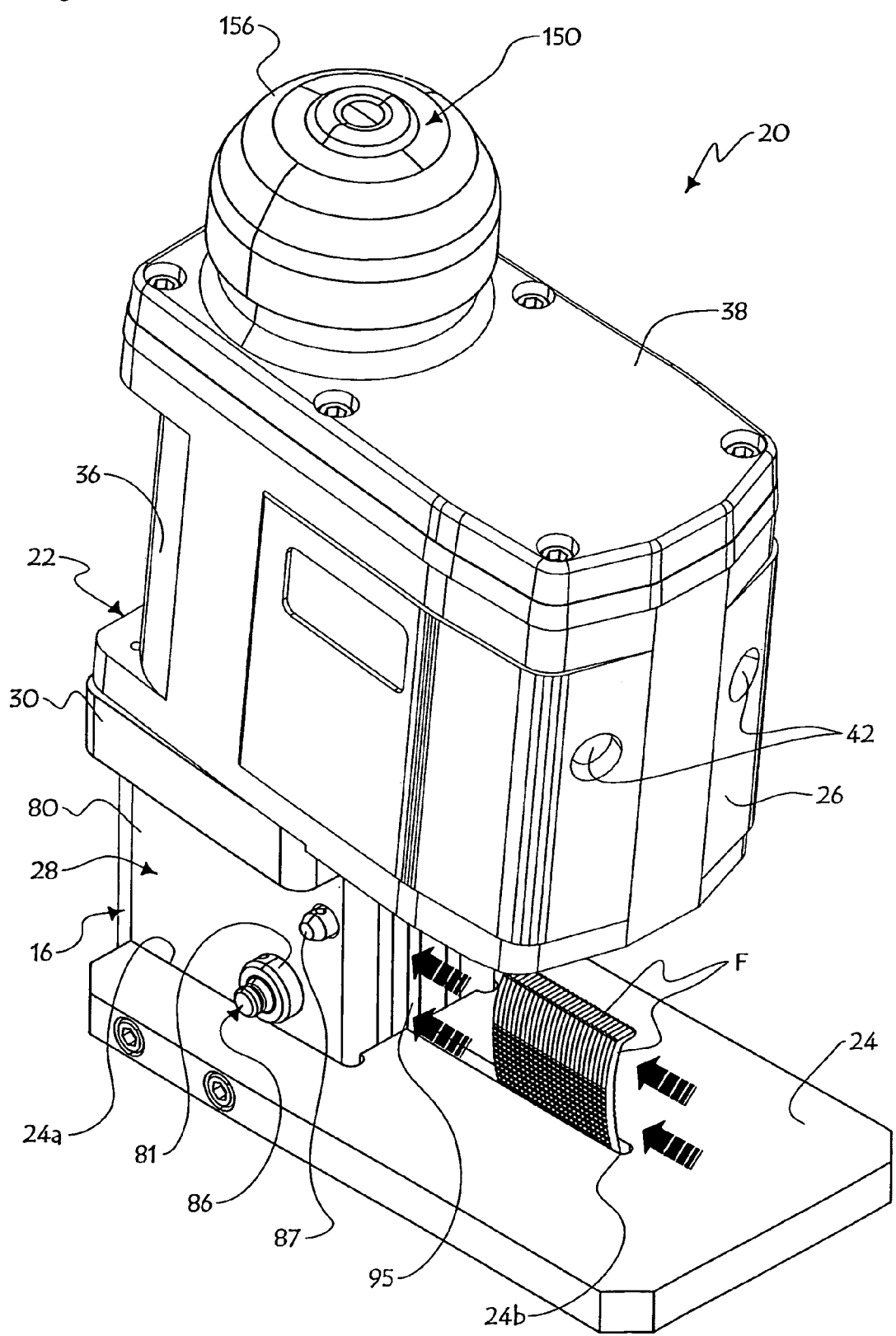
FIG. 2 shows a rear perspective view of a nailing device according to the present invention.

FIGS. 1A-1B show an exemplary prior art pneumatic nailer 200. Prior art nailer 200 comprises a C-shaped main frame 202, having a handle 204 at one end and carrying a nailer housing 206 at the other end. A shoe 208 is affixed to the bottom of nailer 200. Within housing 206 is provided a fastener discharge mechanism (not shown) comprising an elongated straight plunger (not shown). A magazine 210 feeds fasteners to the fastener discharge mechanism. To trigger the fastener discharge mechanism, a workman must hit an anvil member 207 projecting outwardly of housing 206 with a mallet, which causes the plunger to forcibly reciprocate. During the downward stroke of the plunger's reciprocating motion, it strikes a fastener held in magazine 210 which causes the fastener to be shot out of nail 200 through an orifice made in shoe 208, whose location thereon is generally indicated by reference number 209 on FIG. 1B.

In an alternate nailer tool, not shown, a power assist trigger handle could replace the mallet-operated anvil member 207. No clearance above the anvil member would then be needed for the strike sweep of the mallet. The plunger reciprocates axially in a direction illustrated by axis 212, which coincides with the direction in which the mallet preferably hits anvil member 207 to trigger nailer 200. Axis 212 also represents the direction in which the fastener will be ejected out of the nailer 200 when the latter is triggered. Housing 206 is tilted away from frame 202 to allow the fastener to be ejected out of the nailer at an angle (for example at 45° from the vertical), and thus be driven obliquely through a subjacent hardwood plank and into the subfloor. This oblique disposition of housing 206 compromises the nailer's capacity to be operated on hardwood slats located in closely spaced apart fashion relative to an upright wall W, this wall W schematically illustrated by a dotted line in FIG. 1B. Moreover, further sweeping clearance in front of the nailer is required to allow the workman to access the frontwardly inclined anvil member 207 so as to be able to strike it with his mallet. This results in a "dead zone" of undesirably excessive dimensions (symbolically illustrated by double-headed arrow A in FIG. 1B) proximate an upright wall W in which the nailer cannot operate.

FIGS. 2-8 illustrate a pneumatic nailing device 20 according to the present invention. As detailed herein below, nailing device 20 can drive fasteners (such as 320, FIG. 11) in hardwood planks in an oblique direction and yet can still operate in areas closely spaced from upright walls.

Nailing device 20 is destined to be attached to a frame, such as prior art nailer frame 202 illustrated in FIG. 1. Nailing device 20 comprises a main body 22, on the bottom of which a sole 24 is attached, sole 24 forming the member upon which nailing device 20 will bear when laid atop a hardwood plank or other workpiece.

Main body 22 comprises in turn an upper actuator housing 26 and a lower plunger housing 28. A median plate 30 is interposed between actuator housing 26 and plunger housing 28, and housings 26 and 28 are both secured to median plate 30 by sets of bolts 32 and 34 respectively (see FIG. 3). Actuator housing 26 contains a plunger actuator linked to and capable of actuating an arcuate plunger 100 contained in the plunger housing 28.

Actuator housing 26 comprises a hollow casing 36 having an open top sealingly closed off by a closure plate 38 bolted thereto. As best seen in FIGS. 4-7, hollow casing 36 defines a main chamber 40. An elongated auxiliary chamber 44 may optionally be present, as would be the case when retro fitting a casing 36 from a prior art nailer with the present nail driving means. Chamber 44 would then be separated from main chamber 40 by a partition 46; main chamber 40 communicates with auxiliary chamber 44 through an opening 48 made in partition 46. Main chamber 40 is destined to be fed with compressed air, conveyed thereto from a conventional air compressor (not shown) through the instrumentality of a conventional air pipe (not shown) connected to one of the two air inlets 42 (FIG. 2) made in casing 36. It is understood that during the operation of nailing device 20, the one of inlets 42 that is not connected to the air pipe linking casing 36 to an air compressor has to be sealingly closed off using a suitable plug member (not shown), to allow main chamber 40 to become pressurized when the air compressor injects air therein.

Figure 4:
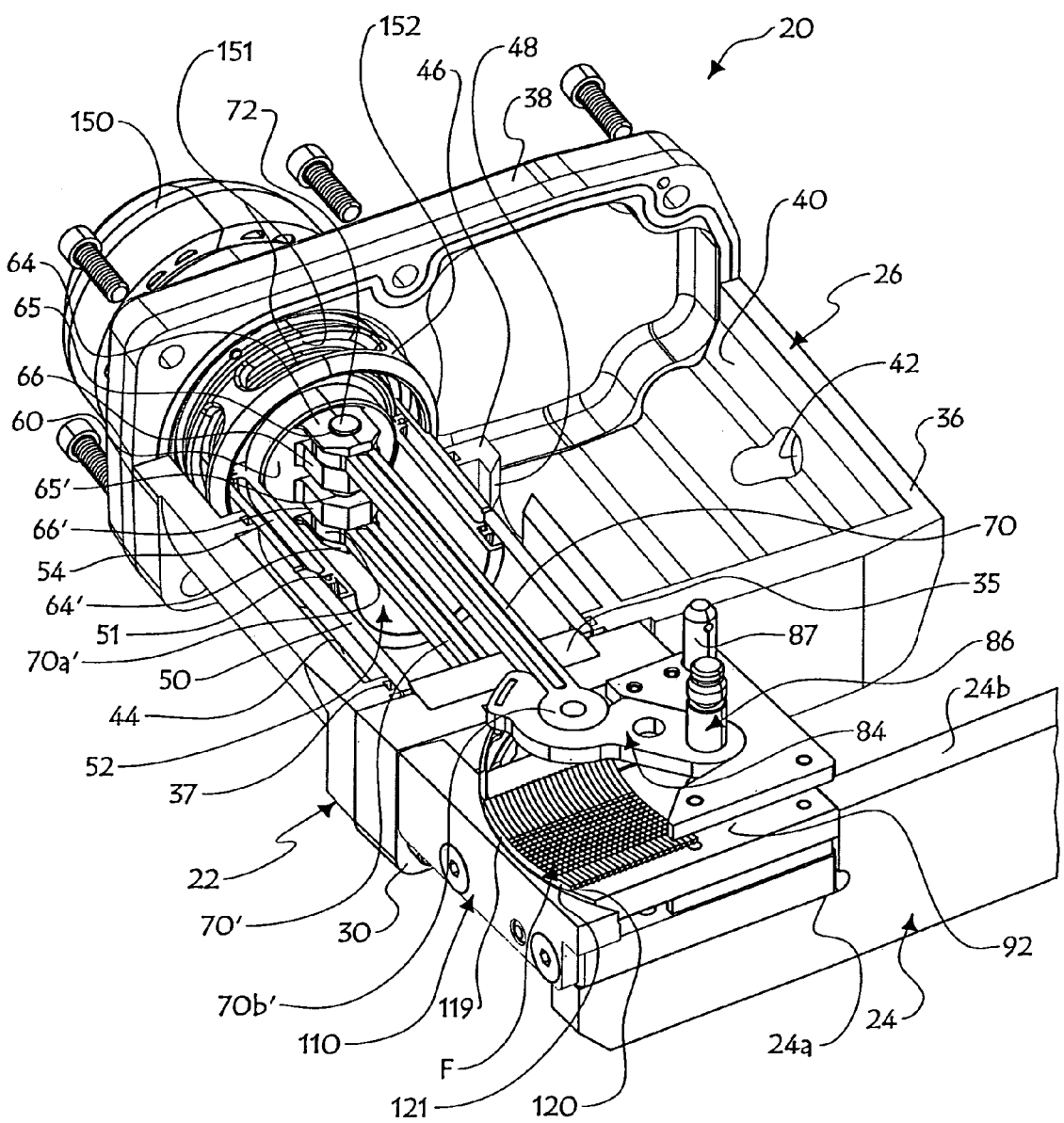
FIG. 4 shows an enlarged partial perspective cross-sectional view of the nailing device showing the components of the actuator and plunger housings, and showing the piston, driving arms and plunger in their respective upper limit position.
Figure 5:
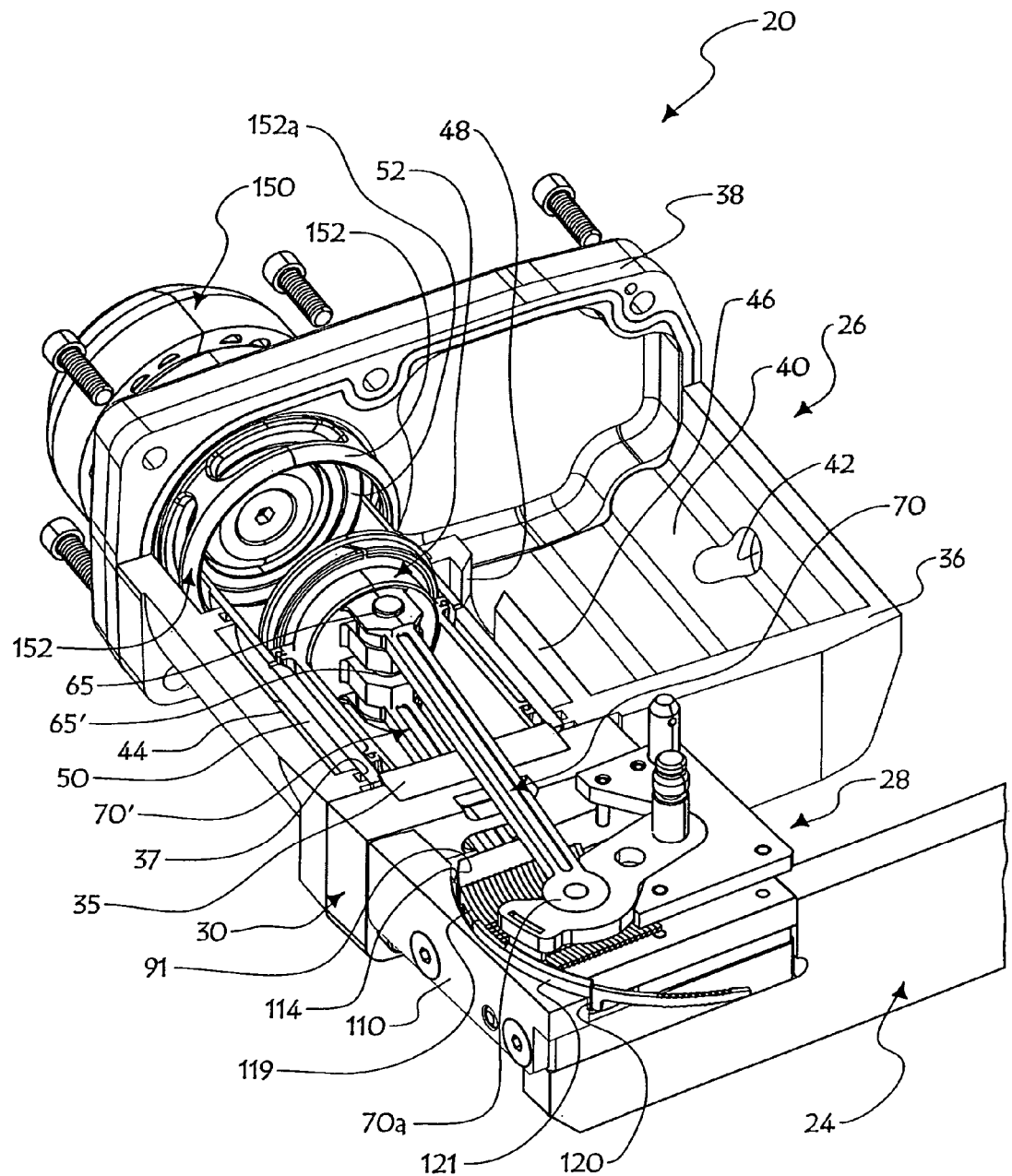
FIG. 5 shows a view similar to FIG. 4 but showing the piston, driving arms and plunger in their respective lower limit position.
Figure 8:
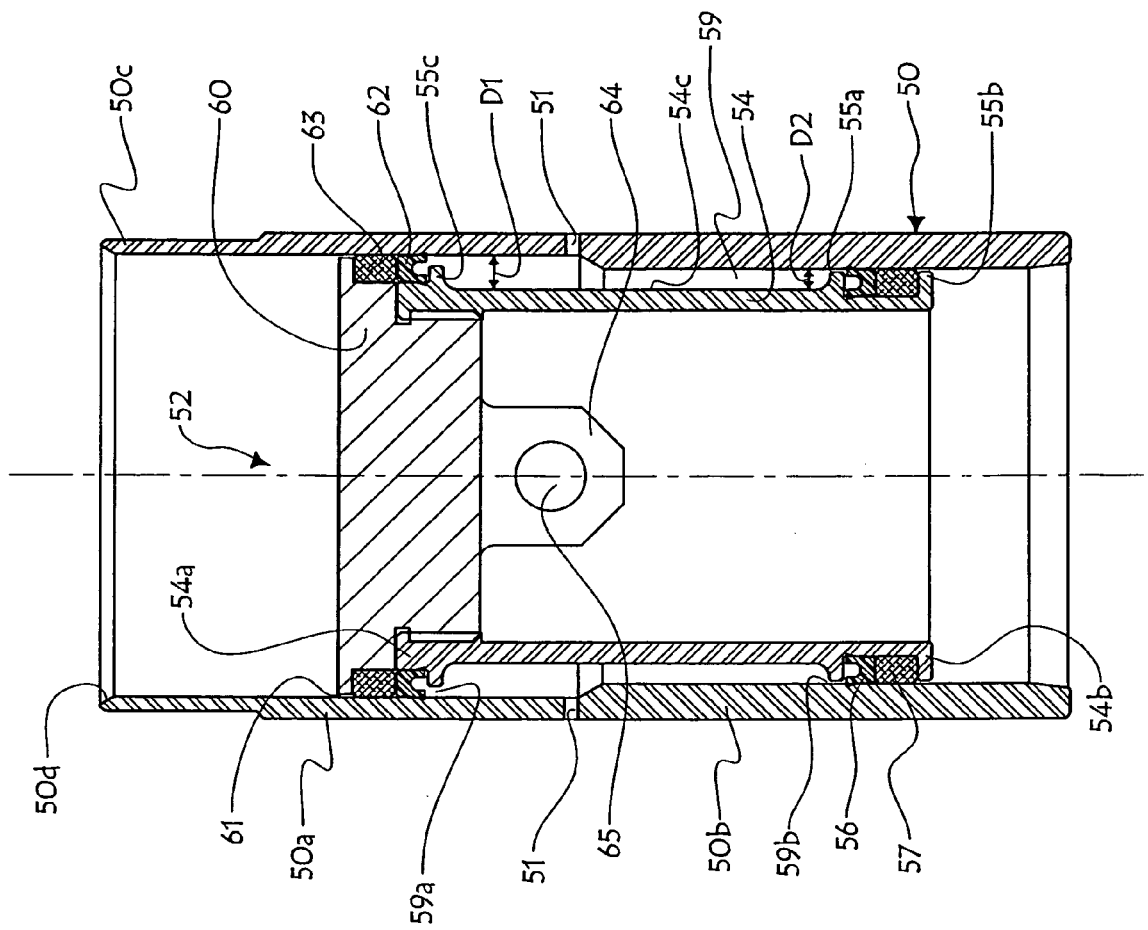
FIG. 8 shows an enlarged cross-sectional view of the cylinder and piston of the nailing device of FIG. 2.

Furthermore, a circular opening 37 is made on the bottom wall of casing 36 in auxiliary chamber 44 (see FIGS. 4-5). A cylinder 50 is contained within casing 36, the bottom end of cylinder 50 being sealingly fitted against the periphery of casing circular opening 37. As best seen in FIG. 8, cylinder 50 defines upper and lower portions 50a, 50b respectively, the inner wall of cylinder lower portion 50b having a slightly smaller diameter than the inner wall of cylinder upper portion 50a. Upper portion 50a defines a top free edge 50d. Moreover, slightly above about the junction between cylinder upper and lower portions 50a, 50b (located within auxiliary chamber 44), a number of small peripherally-spaced air inlet holes 51 are made radially through cylinder 50. Most of the length of cylinder 50 is held within auxiliary chamber 44, and an upper rim portion 50c of cylinder upper portion 50a extends sealingly through partition 46 outwardly of auxiliary chamber 44.

Figure 6:
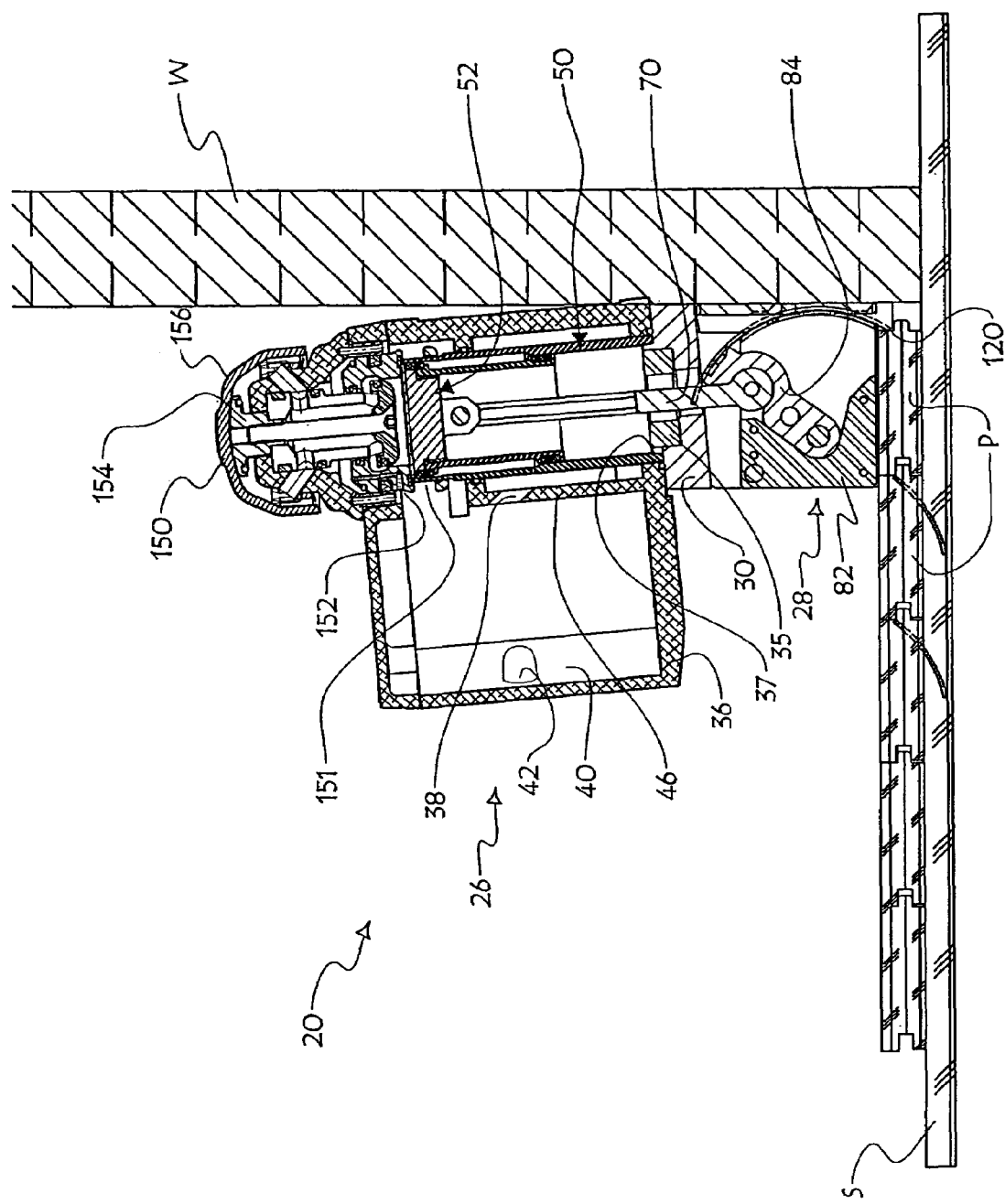
FIG. 6 shows a side cross-sectional view of the nailing device of FIG. 2 laid atop a hardwood plank located closely spaced apart from an upright wall, and showing the piston, driving arms and plunger in their respective upper limit positions.
Figure 7:
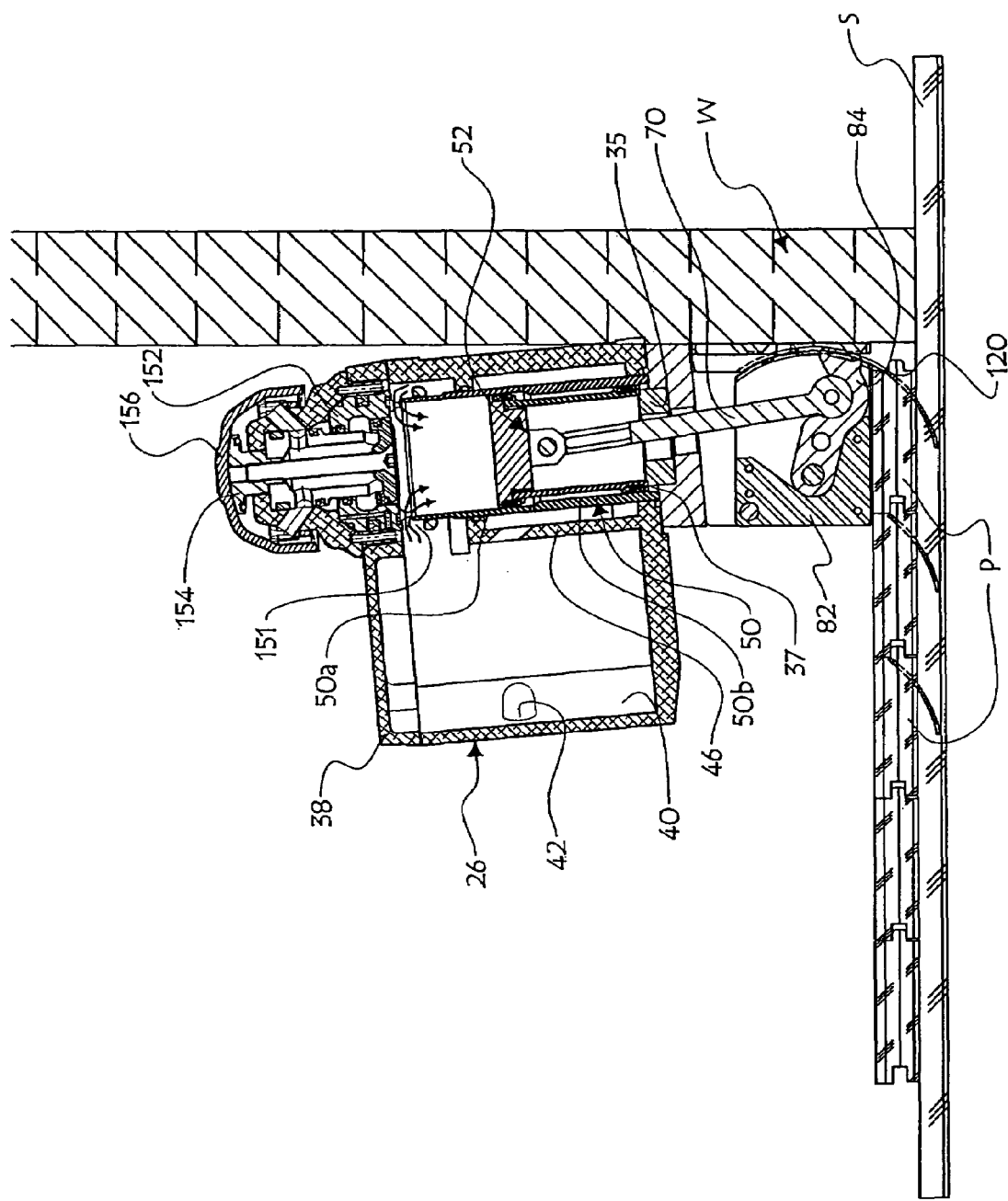
FIG. 7 shows a view similar to that of FIG. 6, but showing the piston, driving arms and plunger in their respective lower limit position.

A piston 52, as best seen in the close-up view of FIG. 8, is slidably nested within the lumen of cylinder 50. Piston 52 is rectilinearly movable within cylinder 50 between a top limit position (FIGS. 4 and 6), and a bottom limit position (FIGS. 5 and 7).

Piston 52 comprises a tubular barrel member 54 defining top and bottom ends 54a, 54b. At the vicinity of its bottom end 54b, barrel member 54 is integrally provided with a pair of spaced-apart, outwardly and radially extending annular flanges 55a, 55b. An annular sealing member 56, and a guiding ring 57 are wrapped around barrel member 54, within the annular gap formed between both flanges 55a, 55b. During the sliding movement of piston 52 within cylinder 50, the piston's bottom annular projection consisting of sealing member 56, and guiding ring 57, and flanges 55a, 55b constantly sealingly engage the inner wall of the narrower cylinder bottom portion 50b.

Furthermore, at the vicinity of its top end 54a, barrel member 54 is integrally provided with another annular flange 55c. Moreover, a piston head 60 is anchored and secured to the open top end of tubular barrel member 54, by engagement of complementary threaded edge portions of head 60 and barrel member 54. Alternately, friction fit interlock between head 60 and barrel member 54 could occur. Piston head 60 also comprises an annular, radially-extending flange 61, and a gap is formed between annular flange 55c of barrel member 54 and flange 61 of piston head 60 within which sealing member 62, and guide ring 63 are fitted. During the sliding movement of piston 52 within cylinder 50, the piston's top annular projection consisting of sealing member 62, and guide ring 63 and flanges 55c and 61 constantly sealingly engage the inner wall of the broader cylinder upper portion 50a.

Barrel member 54 also defines an intermediate cylindrical peripheral wall 54c extending between annular flanges 55a and 55c, barrel wall 54c being distanced from the inner wall of cylinder 50. An annular peripheral chamber 59 is defined between piston 52 and the inner wall of cylinder 50. Chamber 59 is delimited radially inwardly by barrel peripheral wall 54c and radially outwardly by inner wall of cylinder 50, by a chamber top wall 59a (FIG. 8) formed by flange 55c and sealing member 56, and guide ring 57 on the top, and by a chamber bottom wall 59b formed by flange 55a and sealing member 62, and guide ring 63 on the bottom. The top wall 59a extends between barrel peripheral wall 54c and the inner wall of cylinder upper portion 50a, and the bottom wall 59b of annular peripheral chamber 59 extends between barrel peripheral wall 54c and the inner wall of cylinder lower portion 50b. Since the inner wall of upper cylinder portion 50a is wider in diameter than that of lower cylinder portion 50b, chamber top wall 59a is larger and thus has a more important surface area than chamber bottom wall 59b.

Annular chamber 59 can communicate with auxiliary chamber 44 through air inlet holes 51, and air inlet chamber 44 communicates with main chamber 40 through opening 48 made in partition 46; thus, when main chamber 40 is pressurized, annular chamber 59 is also pressurized. When annular chamber 59 is pressurized, more mechanical pressure is applied on chamber top wall 59a than on chamber bottom wall 59b since chamber top wall 59a has a surface area more important than that of chamber bottom wall 59b. Barrel member 54 is therefore constantly subjected to an upward bias when main chamber 40 is pressurized, and piston 52 is thus constantly biased towards its top limit position.

As can be seen in FIGS. 2-7, an anvil member 150 protrudes upwardly from closure plate 38. Anvil member 150 is a compressed-air operated trigger, whose functioning will not be detailed herein for the sake of brevity, a detailed explanation thereof can be found in U.S. Pat. No. 6,834,789 granted to the present applicant. It is noted however that in an alternate embodiment of the invention, not shown, the anvil member 150 could be replaced by a manually operated trigger lever. Such trigger lever would be power assisted by a compressed air load supply, so no forcible hammering strike with a mallet would then be required to operate the release of the nailer.

Anvil member 150, among its numerous internal components, comprises a valve 152 defining radial openings 151. Valve 152 is slidably wrapped around the outer wall of upper rim portion 50c of cylinder 50, and is axially movable in a direction coaxial with cylinder 50. Valve 152 is firmly pressed against the free end of upper rim portion 50c of cylinder 50 when the nailing device 50 is in "standby mode", i.e. awaits triggering to discharge a fastener (as in FIG. 6). In this position, radial openings 151 are covered and obstructed by the outer wall of upper rim portion 50c. In the closed position (FIG. 4) of cylinder 50, top edge 50d engages with sealing member 152a (FIG. 5), to provide an airtight seal therebetween so as to ensure that no compressed air is allowed to leak from casing main chamber 40 into the area of cylinder 50 above piston head 60. In this position of valve 152, no pressure, and thus no downward force is applied by compressed air on the top surface of piston head 60. Since no downward force is applied on piston 52 in this position of valve 152, no force counteracts the upward bias applied on piston 52 within annular chamber 59, and piston 52 is thus maintained in its top position. To trigger the nailing device 20, a workman must strike an exposed plastic cap 156 covering anvil member 150, which causes a subjacent trigger member 154 to be pushed downwardly. This engenders the displacement of a series of internal components of anvil member 150, and eventually brings the valve 152 to be displaced upwardly away from the free open end of cylinder upper rim portion 50c (as in FIG. 7). In this position the valve radial openings 151 are uncovered, and fluid communication between main chamber 40 and the area of cylinder 50 above piston head 60 is therefore established. Compressed air can flow from main chamber 40 through valve radial openings 151 and into the top opening of cylinder 50 to apply an important amount of mechanical pressure on the top surface of piston head 60, and a net downward force is thus applied to piston 52. This downward force overtakes the upward force applied on piston 52 from within annular chamber 59, thus urging the piston 52 downwardly towards its bottom limit position. Shortly after valve 152 has been urged upwardly to clear the upper opening of cylinder 50, pressure differentials within anvil member 150 allow valve 152 to very rapidly return to its "standby" position, i.e. where its is pressed against cylinder top rim 50c and cuts fluid communication between area of cylinder 50 above piston head 60 and main chamber 40.

It is important to note that in the "standby" position of valve 152, overpressure air may not flow from main chamber 40 into cylinder 50, but an exhaust channel is opened up within anvil member 150 which allows compressed air filling the area in cylinder 50 above piston head 60 to be exhausted out in the atmosphere, and this said area to return to atmospheric pressure.

We are now turning back to the structural description of upper actuator casing 26. On the bottom surface of piston head 60 downwardly depend two pairs of attachment tabs 64, 66 and 64', 66' pierced centrally at 65 and 65', respectively, as best seen in FIG. 4-5. Between each pair of tabs 64, 66 and 64', 66' is pivotally attached a distinct one of cam rods 70 and 70'. Indeed, the top end 70a, 70a' of each cam rods 70, 70' is pierced at 71, 71', and a unitary gudgeon pin 72 passes through the holes made respectively in tabs 64, 66 and 64', 66' and in both top ends 70a, 70a' of cam rods 70, 70', thus permitting pivotal connection of the cam rod top ends 70a, 70a' to the undersurface of piston head 60.

Median plate 30, located between upper actuator housing 26 and lower actuator housing 28, comprises a central discoid indentation 31 axially registering with the lumen of cylinder 50 and with hole 37 made in the bottom wall of casing 36. Oblong cam openings 33, 33', spaced apart and parallel to each other, are made through median plate 30 in indentation 31. A cushioning disc 35, made of rubber or other flexible material, is snugly fitted within discoid indentation 31, and comprises oblong cam openings 39, 39' registering with openings 33, 33' respectively of median plate 30.

Cam rods 70, 70' extend from the bottom face of piston head 60, then successively through openings 33, 33' and 39, 39' into the lower plunger housing 28. Cam rods 70, 70', as will soon be described, will communicate the axial movement of piston 60 to a plunger 100 nested in lower plunger housing 28.

Plunger housing 28 is formed of two opposite lateral plates 80, 80', which are bolted to median plate 30 by bolts 32, thereby ensuring the attachment of lower housing 28 thereto. Lateral plates 80, 80' are also each provided with a socket 81, 81'.

Directly inwardly of outer lateral plates 80, 80' are located two irregularly shaped movement constraining plates 82, 82'. Movement constraining plates 82, 82' each define two abutment edges 82a, 82a' and 82b, 82b' (see FIGS. 9-10). Edges 82a and 82b of plate 82 meet at a rounded intersection 82c, and edges 82a' and 82b' of plate 82' meet at a rounded intersection 82c'. Two plate-shaped driving arms 84, 84' are disposed coplanarly with movement constraining plates 82, 82' so that a pierced rounded butt end 84a, 84a' of arms 84, 84' is applied against rounded intersections 82c, 82c' of plates 82, 82'. Each one of driving arms 84, 84', opposite its butt end 84a, 84a', further defines a hand portion 84b, 84b'. As can be seen in FIGS. 3-7, hand portion 84b, 84b' of each one of driving arms 84, 84' is pivotally interlocked with the discoid lower end 70b, 70b' of cam rods 70, 70'.

Moreover, each one of driving arms 84, 84' has a plunger holder tab 84c, 84c' at its outer extremity. Plunger holder tab 84c, 84c' of each driving arm 84, 84' defines an oblong aperture 84d, 84d' extending transversely therethrough. Plunger housing 28 is further provided with an arcuate plunger 100 defining a central arcuate elongated hammer portion 102 and side attachment ears 103 and 103'. Attachment ear 103 is tightly friction-fitted in aperture 84d of driving arm 84, and attachment ear 103' is tightly friction-fitted in aperture 84d' of driving arm 84'. It is noted that a guiding groove 105 is defined on the backside of plunger 100 (only illustrated in FIG. 10), between attachment ears 103, 103'.

Figure 3:
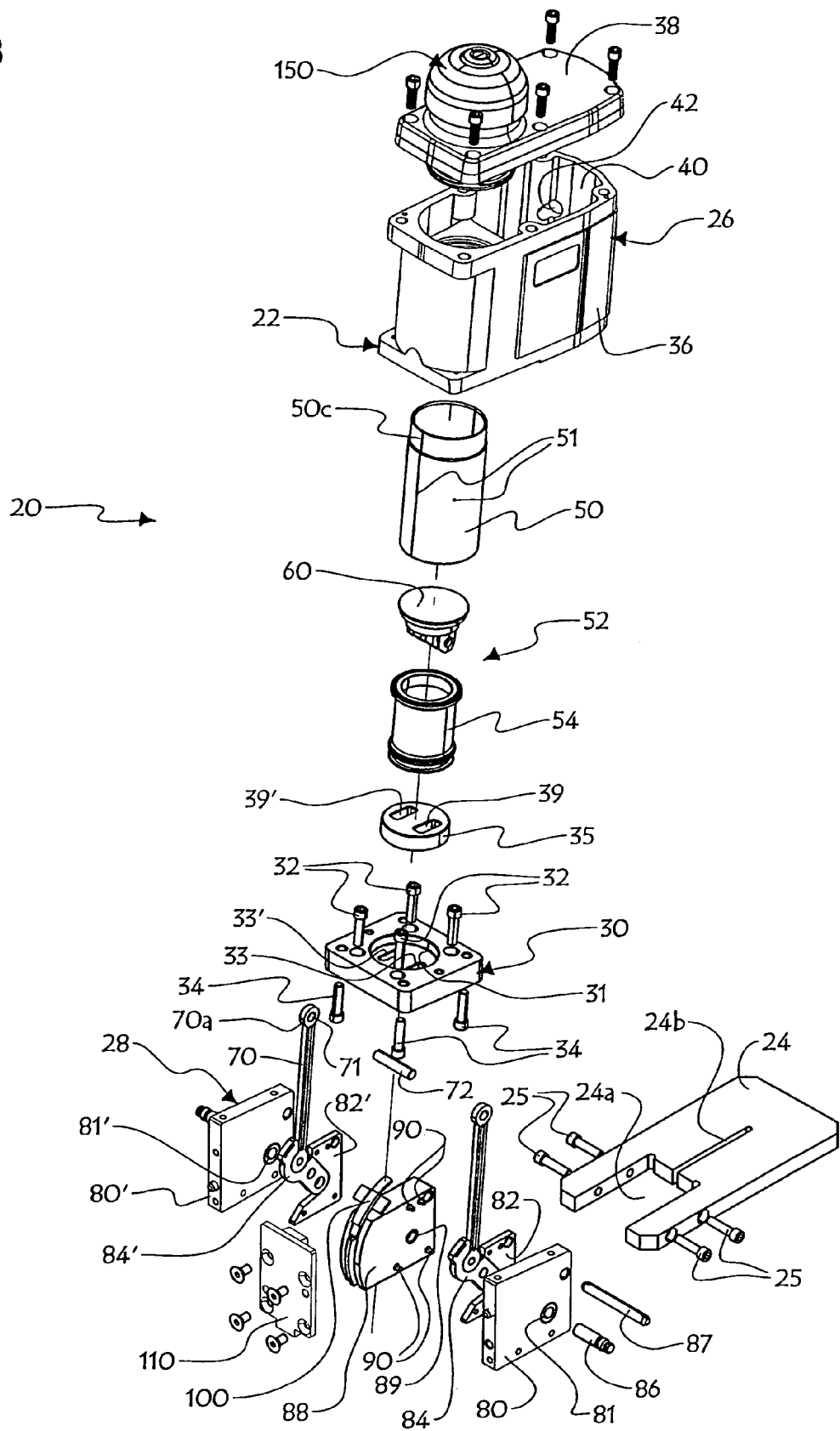
FIG. 3 shows a front exploded perspective view of the nailing device of FIG. 2.
Figure 9:
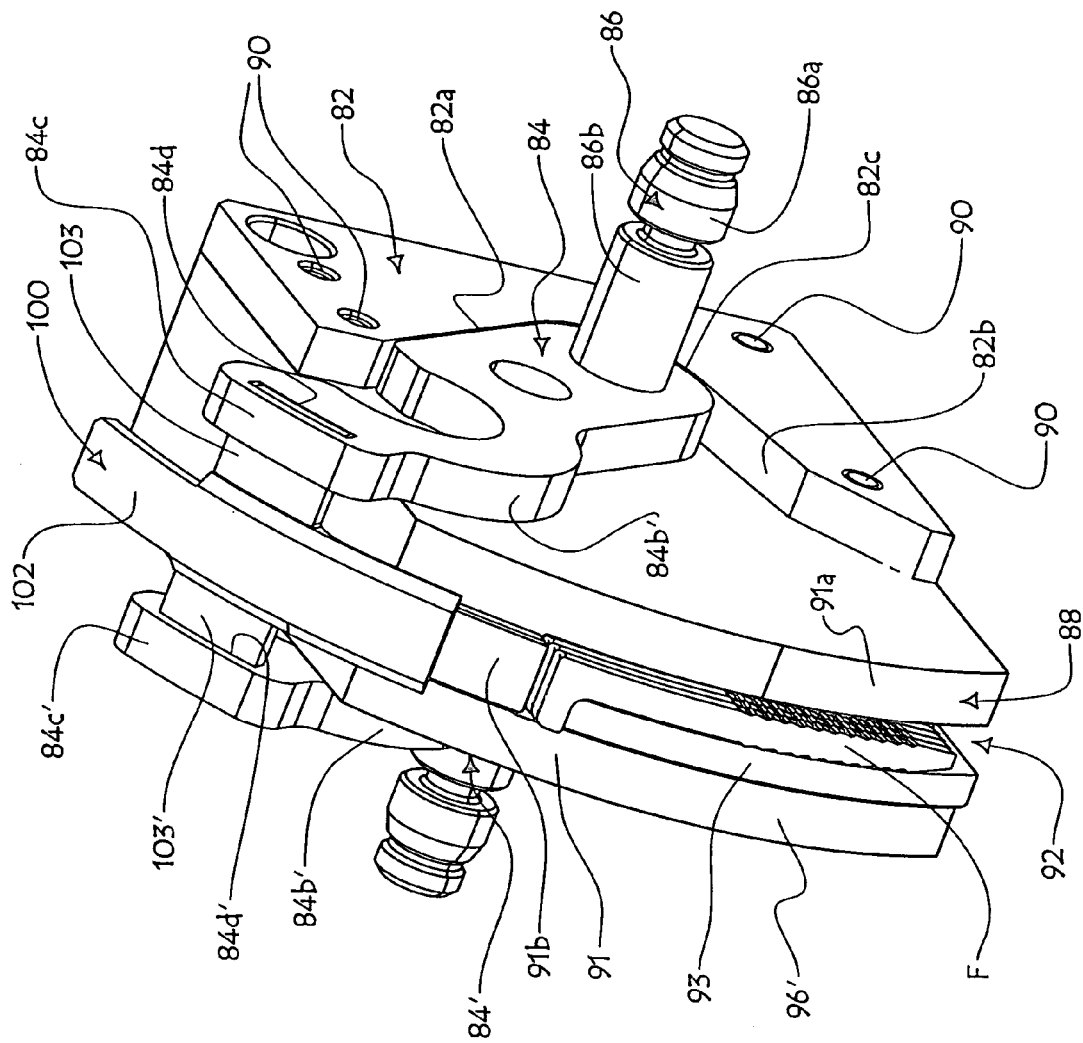
FIG. 9 shows an enlarged front perspective view of the magazine block loaded with fasteners, the movement constraining plates, driving arms and plunger, all contained within the plunger housing of the nailing device of FIG. 2.

A central magazine block 88 is sandwiched between movement constraining plates 82, 82', and is kept properly aligned therewith using a number of alignments pins 90 extending between and friction-fitted in registering holes made in movement constraining plates 82, 82' and magazine block 88 (the only alignment pins 90 shown in the figures are those linking movement constraining plates 82 to magazine block 88—see FIGS. 3 and 9). Magazine block 88 comprises a central fastener channel 92. In the embodiment of the figures, fastener channel 92 is L-shaped to accommodate and support a strip of L-shaped arcuate fasteners F (arcuate fasteners F generally comprise a fastener head F1 and an arcuate main body F2—see FIG. 10). Fastener channel 92 opens outwardly of magazine block 88 on both ends thereof: it opens rearwardly at a vertical and elongated fastener loading opening 95 made in the rear face of magazine block 88 (see FIG. 3), and opens frontwardly at a vertical and elongated fastener outlet window 93 made in an arcuate and convex front face 91 of magazine block 88 (see FIG. 9). Convex front face 91 of magazine block 88 defines a central guiding ridge 91b registering vertically above and coextensive with fastener outlet window 93, and side portions 91a, 91a' on both side of window 93 and guiding ridge 91b. Furthermore, holes 89 are made on both side faces of magazine block 88 (only one hole 89 is shown in the figures—see FIG. 3).

An alignment pin 87 extends transversely across registering holes made through lateral plates 80, 80', movement constraining plates 82, 82' and magazine block 88, to ensure that they remain properly aligned one relative to the other.

Plunger housing 28 further comprises two pivot pins 86, 86', a knob-shaped portion 86a, 86a' thereof being journalled in a corresponding one of sockets 81, 81' of outer lateral plates 80, 80'. (Sockets 81, 81', could alternately be for example ball bearing type sockets) A shank portion 86b, 86b' of each pin 86, 86' extends through and is friction fitted (or alternately anchored in place by a hitch pin, not shown, to be inserted in a bore made in socket 81) in the hole made centrally in rounded butt end 84a, 84a' of corresponding driving arms 84, 84', and loosely pivotally engages registering holes 89 made in the corresponding side face of magazine block 88. Each driving arm 84, 84' is free to pivot as one with the corresponding pivot pin 86, 86' about its journalled connection to socket member 81, 81'.

Consequently, driving arms 84, 84', both connected to the same centrally arranged plunger 100, can pivotally move as one between an upper limit position (see FIGS. 4, 9, 10) in which they abut against the upper abutment edge 82a, 82a' of the corresponding movement constraining plate 82, 82', and a lower limit position (see FIG. 5) in which driving arms 84, 84' abut against lower abutment edge 82b, 82b' of movement constraining plates 82, 82'.

Figure 10:
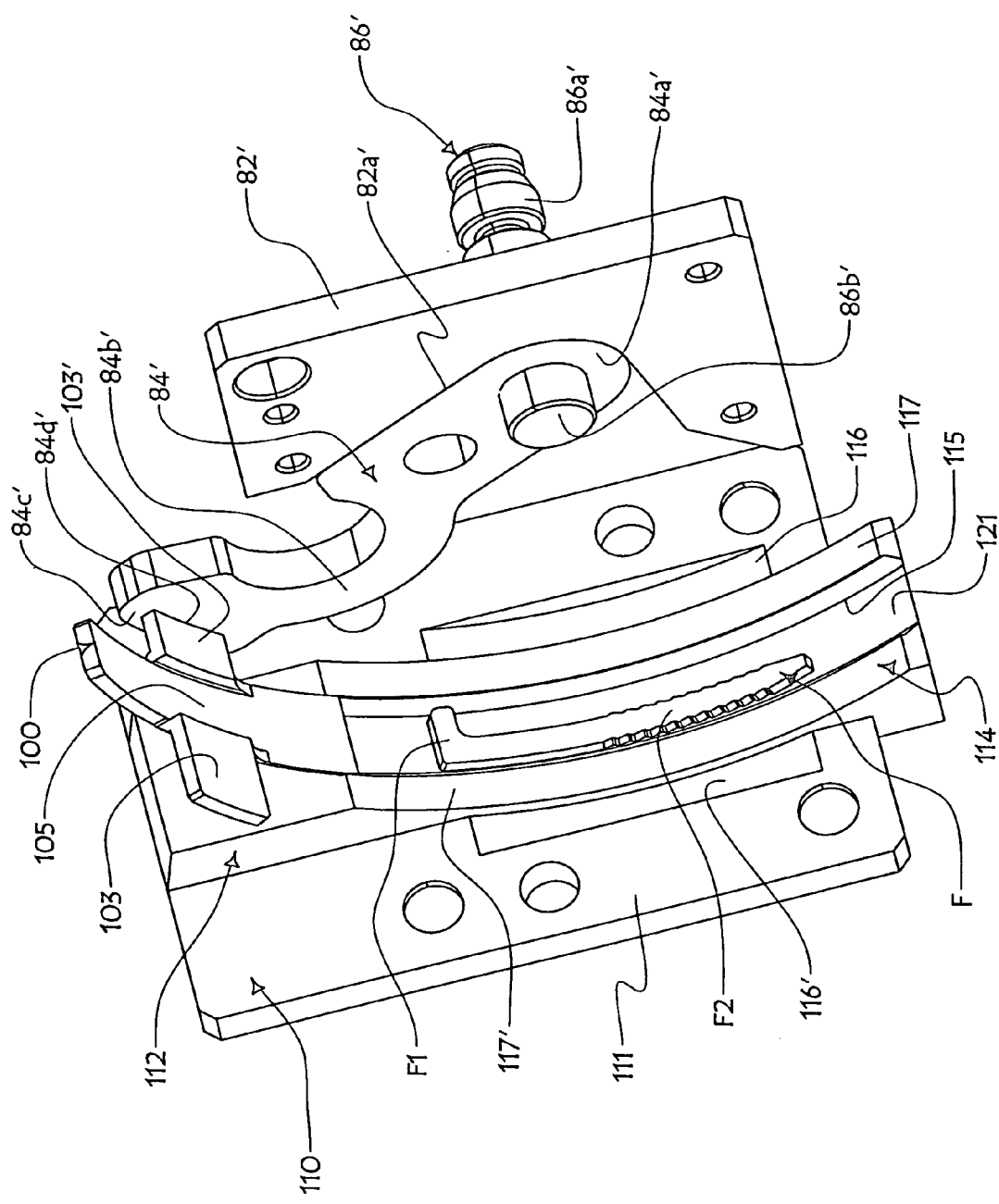
FIG. 10 shows an enlarged rear perspective view of the front cover with an arcuate fastener located in its launching groove, a movement constraining plate, a driving arm and the plunger all contained within the plunger housing of the nailing device of FIG. 2.

Plunger casing 28 also comprises a front cover 110 screwed to lateral guiding plates 80 and 80' so as to extend perpendicularly therebetween. As best seen in FIG. 10, front cover 110 defines a plate-shaped portion 111, and a guiding element 112 projects perpendicularly to its inner face (the face of plate-shaped portion 111 facing magazine block 88). Guiding element 112 extends downwardly beyond the lower edge of plate-shaped portion 111, and is machined or otherwise worked so as to present an arcuate concave surface 114. Arcuate concave surface 114 in turn defines marginal portions 117, 117' on either side of a central launching groove 115 inwardly offset relative to marginal portions 117, 117'. Moreover, arcuate clearances 116, 116' are made on the inner face of front cover 110, on either sides of guiding element 112.

It is noted that as can be seen in FIGS. 4-5, concave face 114 of front cover 110 and convex front face 91 of magazine block 88, both of arcuate shape and having the same curvature radius, are slightly spaced apart and positioned in facing register one relative to the other. More particularly, marginal portion 117, 117' of concave face 114 fronts side portions 91a, 91a' respectively of convex face 91, and central launching groove 115 of concave face 114 fronts guiding ridge 91b and fastener outlet window 93 of convex front face 91. This arcuate gap formed between arcuate concave face 114 of front cover 110 and arcuate convex front face 91 of magazine block 88 will be further referred to as the arcuate guiding channel 119, and the portion of guiding channel 119 between central launching groove 115 of concave face 114 and guiding ridge 91b and fastener outlet window 93 of convex front face 91 will be further referred to as the fastener ejection channel 121. Fastener ejection channel 121 opens outwardly of nailing device 20 at a fastener discharge opening 120 (see FIGS. 4-7).

Lower plunger housing 28 is also attached to sole 24, as described herein above (see FIGS. 2-5). Indeed, lower plunger housing 28 is fitted in a gap 24a at the front end of sole 24, and is secured in place by a set of bolt 25 securing sole 24 to outer lateral plates 80, 80' of plunger housing 28. Moreover, a slot 24b extends from gap 24a towards the rear of sole 24, without however reaching the latter's rear edge. This slot 24b is aligned with fastener channel 92 such that the end of slot 24b opening into gap 24a registers with the rear loading opening of channel 92. This slot 24b provides a certain clearance for the lower tip of fasteners F to facilitate the insertion of a fastener strip in fastener channel 92 through its rear fastener loading opening 95. Also, the undersurface of sole 24 is level with the bottom edges of lateral plates 80, 80' of movement constraining plates 82, 82' and of magazine block 88, and of plate-shaped portion 111 of front cover 110. However, the bottom end of guiding element 112 depends downwardly beyond the undersurface of sole 24, as can be readily seen in FIGS. 4-7.

The use of nailing device 20 on hardwood flooring tongue-and-groove type planks will now be described. Nailing device 20, after having being connected to a compressed-air source and loaded with a strip of fasteners F, is first positioned above a hardwood plank P so that the portion of guiding element 112 of plunger housing front cover 110 extending downwardly beyond the undersurface of sole 24 abuts against the edge of the hardwood plank, as shown in FIG. 6. Then, once nailing device 20 is suitably positioned, a workman must strike its anvil member 150, with a mallet for example, in order to trigger the nailing device. As mentioned above, the striking of anvil member 150 causes trigger member 154 to be pushed downwardly, in turn engendering the upward displacement of valve 152 which moves away from the upper free end of cylinder 50. In this position of valve 152, compressed air from main chamber 40 flows through valve radial openings 151 and into cylinder 50 above piston head 60, and applies an important amount of pressure on piston head 60. A net downward force is therefore applied to piston 52, which causes the piston 52 to be urged downwardly from its upper limit position (FIG. 4, 6) to its downward limit position (FIGS. 5, 7). At the end of the brisk and forceful displacement of piston 52 towards its lower limit position, bottom end 54b of barrel member 54 impacts on cushioning disc 35, the latter acting as a shock absorber.

As piston 52 moves downwardly, cam rods 70, 70' which are attached at their top end 70a, 70a' to the bottom of piston head 60, are also displaced downwardly. Concomitantly, cam rods 70, 70' communicate the downward motion of piston 52 to driving arms 84, 84' with which they are pivotally interlocked. Accordingly, as piston 52 progressively moves towards its lower limit position, the driving arms 84, 84' are concomitantly pivoted from their upper limit position (FIGS. 4, 6, 9, 10) towards their bottom limit position (FIGS. 5, 7).

As driving arms 84, 84' move from their upper limit position towards their bottom limit position, plunger 100 will sweep guiding channel 119. At the beginning of its course from its upper limit position towards its lower limit position, the movement of plunger 100 will be guided by the sliding engagement of plunger guiding groove 105 against guiding ridge 91b of magazine block 88. In this downstroke of plunger 100, hammer portion 102 will sweep launching groove 115 and thus the arcuate fastener ejection channel 121, in which a fastener F is loaded. The width of fastener ejection channel 121, and more particularly the width of the gap between guiding ridge 91b of magazine block 88 and launching groove 115 of front cover 110, is such that only one fastener F of the strip of fasteners contained in fastener channel 92 stands in the path of hammer portion 102 when plunger 100 sweeps fastener ejection channel 121. Therefore, as plunger 100 accomplishes its downstroke, it forcefully strikes a single arcuate fastener F and pushes it downwardly along the arcuate path formed by fastener ejection channel 121 towards fastener discharge opening 120. As driving arms 84, 84' and plunger 100 approach their lower limit position, fastener F is ejected out of nailing device 20 through fastener discharge opening 120, driven in the subjacent hardwood plank P and into the subfloor S.

It is noted that the fastener, after it is struck by hammer portion 102 of plunger 100, is kept firmly pressed against the arcuate and concave launching groove 115 of front cover guiding element 110. This firm support will prevent the fastener from buckling when it is forcibly struck and forced out of the nailer along arcuate fastener ejection channel 121.

During the downward stroke of the driving arms 84, 84' and of the plunger 100, the outer plunger attachment tabs 84c, 84c' of driving arms 84, 84' sweep arcuate clearances 116, 116', and the portion of attachment ears 103, 103' between driving arm attachment tabs 84c, 84c' and plunger hammer portion 102 will sweep the gap between marginal portion 117, 117' of front cover central projection 114 and side portions 91a, 91a' of magazine block convex front face 91.

Soon after the piston has been moved to its lower limit position, as described herein above, valve 152 as mentioned herein above, moves downwardly and switches back to its standby position where it is pressed against the upper rim portion 50c of cylinder 50, thereby cutting off fluid communication between main chamber 40 and the area of cylinder 50 above piston head 60. Moreover, in this position of valve 152, an air exhaust channel circulating through anvil member 150 is opened up which causes the depressurization of the volume of cylinder 50 above piston head 60. Consequently, the upward bias applied on piston 52 within annular chamber 59 becomes unopposed, which causes piston 52 to move back to its upper limit position, concomitantly bringing driving arms 84, 84' and plunger 100 back to their upper limit position. At this point, the nailing device 20 is reloaded and ready for another nailing cycle.

An important advantage of the present invention is the fact that the nailing device can drive fasteners 320 (FIG. 12) in an oblique fashion (as opposed to vertically straight down), without however compromising its ability to operate in areas adjacent to walls. This can be seen in FIGS. 6-7, where nailing device 20 is shown pressed against an upright wall W. The fact of providing an arcuate guiding channel along which arcuate fasteners (320) can travel before being driven in the subjacent planks and subfloor obviates (1) The necessity of having to arrange the nailing mechanism obliquely in order for the fasteners to be driven in an oblique direction;

(2) The necessity of a clearance in front of the nailer to allow the workman to strike the obliquely arranged anvil member.

The embodiment of the invention shown in the figures and described is exemplary and it is understood that modifications thereto could be made without departing from the scope of the present invention as defined in the following claims. For example, instead of having an L-shaped fastener channel, the magazine block could be provided with a differently shaped fastener channel, such as a T-shaped channel for holding correspondingly T-shaped arcuate cleats, or an inversely U-shaped for holding arcuate U-shaped staples. More generally, magazine block could even be provided with a universal magazine channel in which diverse modular fastener adaptors could be fitted to use the nailer with fasteners of various shapes.

Furthermore, a biasing member could be provided in the fastener channel to bias the fastener strip held therein towards the arcuate fastener ejection channel and against the concave launching groove of the guiding element of the plunger housing's front cover, against which the foremost fastener of strip is pressed before it is struck and swept by the plunger.

Alternately, the plunger could have any other suitable shape, as long as it is geometrically compatible with the fastener ejection channel of the plunger housing, and is shaped so as to be capable of sweeping the fastener ejection channel in order to forcibly strike a fastener loaded therein.

In yet another embodiment of the instant invention, the nailing device could be a manual tool, i.e. not operated with compressed air. In such an embodiment, the plunger actuator of the embodiment shown in the figures, instead of providing a pneumatically-actuated piston axially moved along a cylinder when the anvil member is struck, another rectilinearly movable member such as an axially movable impact rod projecting out of the nailing device's main body could be provided. This impact rod, similarly to piston 52 of the embodiment illustrated in the figures, would be pivotally linked to the cam rods in turn connected to the plunger driving arms. To operate this variant of the present invention, the workman would need to forcefully strike the free end of the impact rod projecting out of the nailing device's main body, thus causing an axial downward displacement of the impact rod and thus the downstroke of the plunger through the instrumentality of the cam rods.

The present invention also relates to new and improved fasteners, used for hardwood flooring for example.

One embodiment of the fastener of the present invention, in the form of an L-shaped cleat 20, is shown in FIGS. 12-13. Cleat 320 defines front and rear faces 320a and 320d, and lateral faces 320b and 320c, and has a cross-sectionally rectangular elongated shank portion 322, and a head portion 325 integrally and perpendicularly extending from one end of shank portion 322. Shank portion 322 is provided with a number of lengthwisely spaced barbs 324 outwardly projecting from lateral faces 320b, 320c, and defines a penetration tip 326 at the other end of shank 322 opposite head portion 325. Cleat 320 is curved, as best shown in FIG. 12, and defines a radius of curvature R whose value may equal 5.5 centimeters, for example. Radius of curvature R matches that of ejection channel 121. This curved shape provides cleat 320 with more anchoring strength, as described hereinafter.

Figure 14:
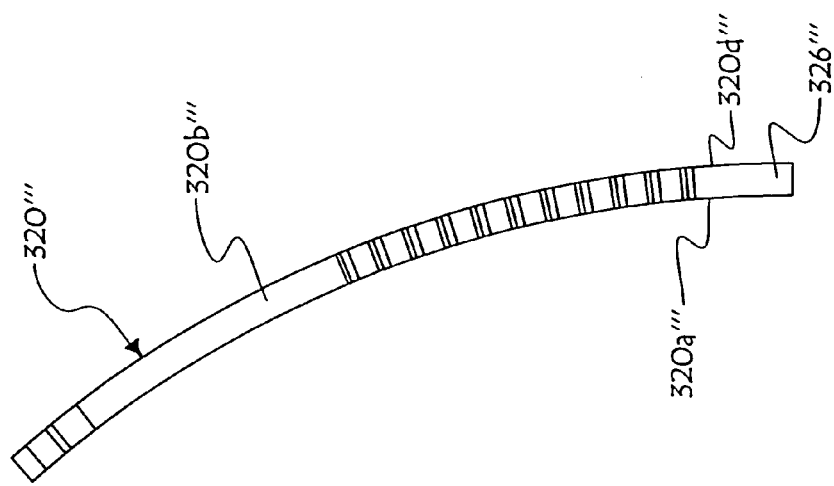
FIGS. 14, 15 and 16 show a side elevational view of arcuate cleats according to alternate embodiments of the present invention.
Figure 15:
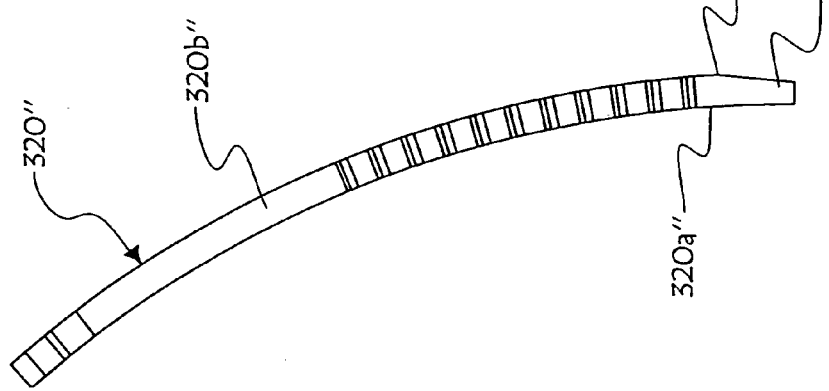
Figure 16:
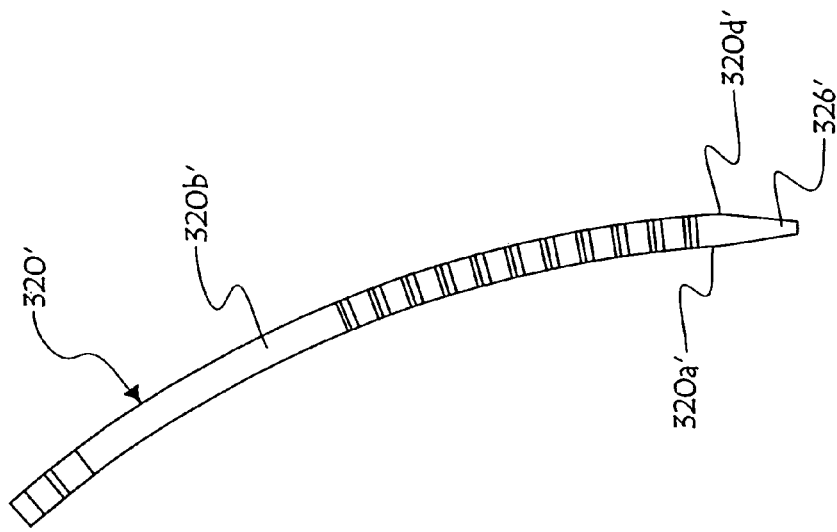

The lateral faces 320b, 320c of cleat penetration tip 326 are inwardly bevelled, to facilitate penetration of cleat 320 in a hardwood plank for example. In the embodiment of cleat 320 shown in FIGS. 11-13, the front concave face 326a of penetration tip 326 is also inwardly bevelled. However, penetration tip 326 may have alternate shapes, as shown in FIGS. 14-16. FIG. 14 shows an alternate cleat 320', where both the front and rear faces 320a' and 320d' of penetration tip 326 are inwardly bevelled. FIG. 15 shows another alternate cleat 320" where only the rear convex face 320d" of penetration tip 326" is inwardly bevelled. FIG. 16 shows yet another alternate cleat 320'" where the front and rear faces 320a'", 320d'" of penetration tip 326'" are not bevelled, and have the same radius of curvature as the rest of cleat 320'".

In yet another embodiment of the invention, the arcuate fastener could be made from wire staples.

Figure 17:
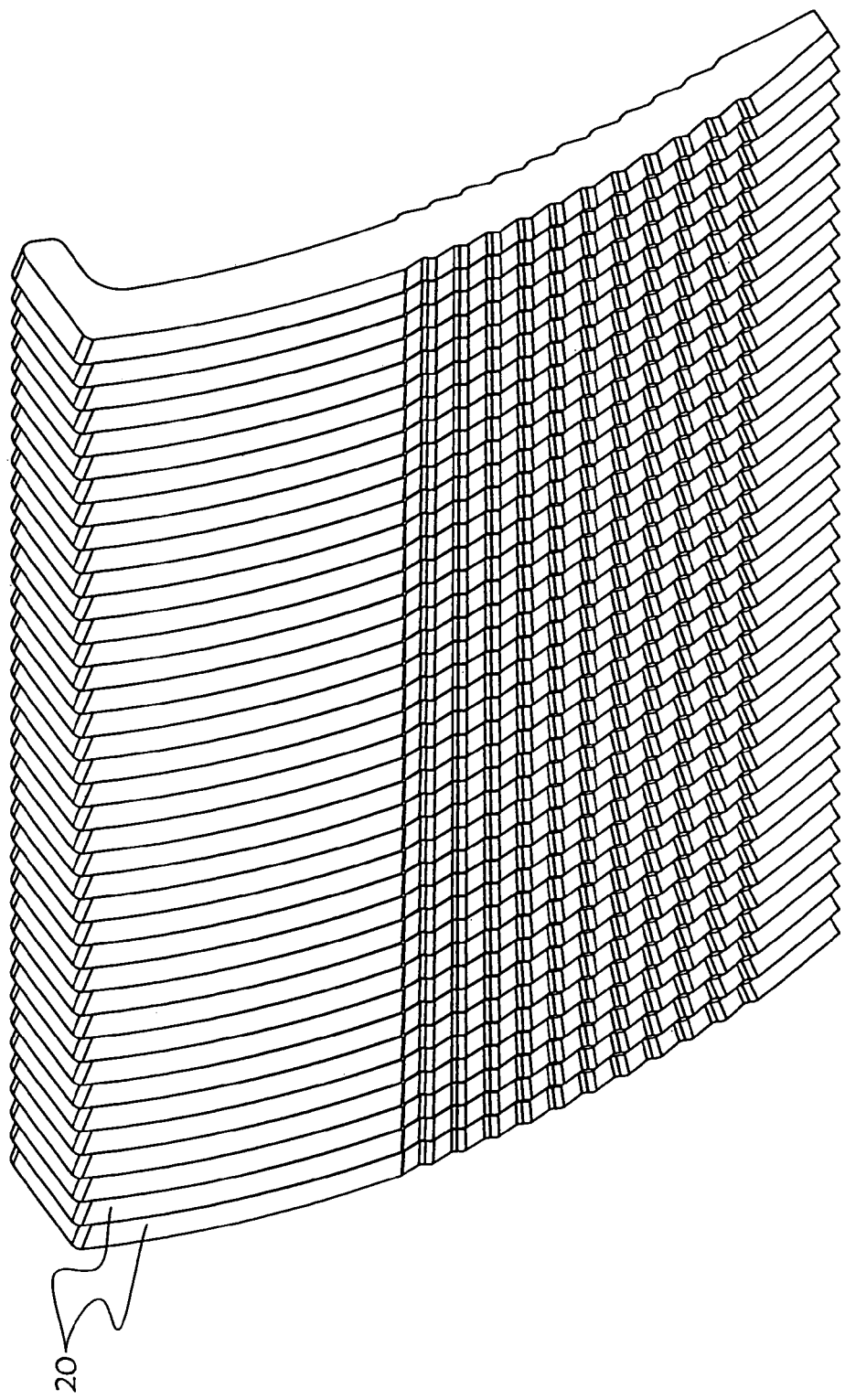
FIG. 17 is a perspective view showing a number of cleats similar to that of FIGS. 11-13, stacked and collated together to form a strip of cleats, usable with the present nailer.

FIG. 17 shows how the fasteners are collated together in an operative fashion.

The invention claimed is:

1. A nailing device for securing hardwood flooring planks to a subfloor using arcuate fasteners, said nailing device comprising:
   a main body defining a fastener discharge opening;
   a fastener ejection channel made in said main body, said fastener ejection channel being arcuate and for accommodating an arcuate fastener, said fastener ejection channel opening outwardly of said nailing device at said fastener discharge opening;
   a plunger at least partially nested in said fastener ejection channel, said plunger movable along said fastener ejection channel between first and second limit positions; and
   a plunger actuator nested in said main body and connected to said plunger, wherein said plunger actuator can be selectively activated for moving said plunger between its said first and second limit positions;
   wherein upon activation of said plunger actuator, said plunger will move along said fastener ejection channel from said first limit position towards said second limit position to forcibly strike the arcuate fastener located in said fastener ejection channel and eject it out of said nailing device through said fastener discharge opening and into a subjacent workpiece;
   wherein said plunger actuator comprises at least one driving arm pivotally connected to said main body at one end and carrying said plunger at the other end, whereby said plunger is movable between its said first and second limit positions upon said driving arm being pivotally actuated; and
   wherein said plunger actuator further comprises a rectilinearly movable member capable of moving rectilinearly within said main body between first and second limit positions, said plunger actuator further comprising at least one cam member pivotally connected to said rectilinearly movable member at one end and to said driving arm at the other end, wherein upon selective activation of said plunger actuator, said rectilinearly movable member is actuated from its said first limit position towards its said second limit position, and said driving arm is concomitantly pivotally actuated such that said plunger moves from said first limit position towards said second limit position.

2. The nailing device according to claim 1, wherein said plunger comprises an elongated and arcuate hammer portion sweeping said fastener ejection channel for striking the fastener therein when said plunger actuator is selectively activated.

3. The nailing device according to claim 1, wherein said plunger actuator is compressed-air operated and said nailing device is provided with a compressed-air inlet for conveying compressed air thereto, said plunger actuator further comprising a cylinder defining an inner wall and an open end, said rectilinearly movable member being a piston sealingly and slidably engaging said cylinder inner wall and defining a piston head, said plunger actuator further comprising a valve selectively movable between open and closed positions, wherein said valve can be selectively moved to its open position to allow compressed air to flow into said cylinder in the area between said cylinder open end and said piston head in order for the compressed air to exert a pushing force on said piston biasing it towards its said second limit position.

4. The nailing device according to claim 3, wherein said cylinder inner wall comprises first and second cylinder inner wall portions, said first inner wall portion having a diameter larger than that of said second inner wall portion;
wherein said piston defines a cylindrical outer peripheral wall distanced from said cylinder inner wall by first and second annular spaced-apart projections projecting radially outwardly of said piston peripheral wall, said first annular projection being larger than said second annular projection, said first annular projection constantly engaging said first cylinder inner wall portion and said second annular projection constantly engaging said second cylinder inner wall portion during the movement of said piston between its said first and second limit positions;
wherein an annular chamber is defined between said cylinder inner wall, said piston peripheral wall and said first and second annular projections; wherein said annular chamber comprises a compressed air inlet and said annular chamber is constantly pressurized during the operation of said nailing device, and a biasing force is thus constantly applied by compressed air from within said annular chamber on said piston and biasing said piston towards said first limit position; wherein said biasing force applied from within said annular chamber is less important than said pushing force.

5. The nailing device according to claim 1,
wherein said main body further defines a fastener channel for accommodating arcuate fasteners and for loading the arcuate fasteners in said fastener ejection channel.

6. The nailing device according to claim 1,
wherein said fastener ejection channel consists of at least a launching groove made in said main body.

7. A nailer for securing hardwood flooring planks to a subfloor in edgewisely closely spaced fashion relative to an upstanding wall, said nailer for use with arcuate nails and comprising:
  an elongated rigid main frame, said main frame defining a front end for facing the upstanding wall, and a rear end opposite said front end, and said main frame including a load bearing lower end portion for engagement over the flooring planks, an intermediate section defining a front end abutment surface for lateral abutment against the upstanding wall in an operative condition thereof, and an upper end portion adapted to transversely clear the upstanding wall in said operative condition;
  an arcuate channel, made through said main frame lower end portion and for accommodating the arcuate nails, said channel defining a nail discharge outlet mounted at a lowermost position of said main frame in said operative condition thereof; and
  ejection means, for power ejecting an arcuate nail one at a time through said nail discharge outlet and into the flooring planks and subfloor;
  further including trigger means, mounted at said upper end portion of said main frame, said trigger means for actuating said ejection means; and
  wherein said trigger means includes an anvil member, exposed at the upper end portion of said main frame said anvil member for receiving mallet strike blows along a sweeping strike blow axis for enabling actuation of said ejection means.

8. A nailer as in claim 7,
wherein the portion of said sweeping strike blow axis within said main frame lower end portion is rearwardly offset relative to said main frame front end.

9. A nailer as in claim 8,
wherein the portion of said sweeping strike blow axis within said main frame lower end portion is rearwardly offset relative to said nail discharge outlet.

10. A nailer as in claim 7,
wherein said anvil member upwardly rearwardly diverges relative to the plane of said main frame front end.

11. A nailer as in claim 10,
wherein said anvil member upwardly rearwardly diverges relative to said nail discharge outlet.

12. A nailer as in claim 11,
wherein said ejection means is pneumatically assisted.

13. A nailer as in claim 7,
wherein the portion of said strike blow axis within said main frame lower end portion comes in vertical register with said main frame front end.

14. A nailer as in claim 13,
wherein the portion of said strike blow axis within said frame lower end portion comes in vertical register with said nail discharge outlet.

* * * * *